United States Patent
Wurm et al.

(10) Patent No.: US 12,325,157 B2
(45) Date of Patent: Jun. 10, 2025

(54) MOLD RELEASE FOR ENGINEERED STONE AND OTHER MOLD RELEASE APPLICATIONS

(71) Applicant: Sekisui Specialty Chemicals America, LLC, Dallas, TX (US)

(72) Inventors: David B. Wurm, Pasadena, TX (US); George Shitera, Pasadena, TX (US); Vinh Nguyen, Pasadena, TX (US)

(73) Assignee: SEKISUI SPECIALTY CHEMICALS AMERICA, LLC, Pasadena, TX (US)

( * ) Notice: Subject to any disclaimer, the term of this patent is extended or adjusted under 35 U.S.C. 154(b) by 0 days.

(21) Appl. No.: 18/412,029

(22) Filed: Jan. 12, 2024

(65) Prior Publication Data
US 2024/0239024 A1    Jul. 18, 2024

Related U.S. Application Data

(60) Provisional application No. 63/479,846, filed on Jan. 13, 2023.

(51) Int. Cl.
| | | |
|---|---|---|
| *B29C 33/60* | (2006.01) | |
| *C10M 173/02* | (2006.01) | |
| *C10N 30/16* | (2006.01) | |
| *C10N 30/18* | (2006.01) | |
| *C10N 40/36* | (2006.01) | |

(52) U.S. Cl.
CPC ........... *B29C 33/60* (2013.01); *C10M 173/02* (2013.01); *C10M 2209/04* (2013.01); *C10N 2030/16* (2013.01); *C10N 2030/18* (2013.01); *C10N 2040/36* (2013.01)

(58) Field of Classification Search
CPC . B29C 33/60; C10M 173/02; C10M 2209/04; C10N 2030/16; C10N 2030/18; C10N 2040/36
See application file for complete search history.

(56) References Cited

U.S. PATENT DOCUMENTS

| | | | |
|---|---|---|---|
| 5,981,646 A | 11/1999 | Huber et al. | |
| 6,437,021 B1 * | 8/2002 | Wettling | A01N 25/26 424/405 |
| 6,627,694 B1 | 9/2003 | Luca | |
| 2001/0014345 A1 * | 8/2001 | Batts | A01N 25/26 424/405 |
| 2008/0047464 A1 * | 2/2008 | Henning | B29C 33/60 106/38.22 |
| 2008/0289532 A1 * | 11/2008 | Henning | C08K 5/0008 264/300 |
| 2009/0142503 A1 * | 6/2009 | Hotaling | C10M 173/02 427/422 |
| 2022/0186443 A1 * | 6/2022 | Spender | D21H 17/68 |
| 2022/0332934 A1 * | 10/2022 | Barnabas | C08L 29/04 |
| 2023/0404072 A1 * | 12/2023 | Decru | A01P 1/00 |

FOREIGN PATENT DOCUMENTS

| | | |
|---|---|---|
| CN | 109228057 A | 1/2019 |

OTHER PUBLICATIONS

International Search Report issued in International Application No. PCT/US2024/011410 mailed on Apr. 16, 2024 (15 pages).
Written Opinion issued in International Application No. PCT/US2024/011410 mailed on Apr. 16, 2024 (9 pages).

\* cited by examiner

*Primary Examiner* — Ellen M McAvoy
(74) *Attorney, Agent, or Firm* — Osha Bergman Watanabe & Burton LLP

(57) ABSTRACT

A homogeneous, aqueous mold release solution including: 5 to 90 wt % water; 3 to 40 wt % polyvinyl alcohol; 0.01 to 3.2 wt % surfactant; 1 to 20 wt % sugar alcohol; 0.005 to 1.05 wt % defoamer; and up to 50 ppm biocide, where a total of all components adds to 100 wt %. The mold release solutions have a viscosity in a range from 20 to 600 cps when measured at 23° C. In another aspect, embodiments disclosed herein relate to a homogeneous, aqueous mold release solution including: 5 to 85 wt % water; 10.5 to 15 wt % polyvinyl alcohol; 0.56 to 0.8 wt % surfactant; 1 to 8 wt % sugar alcohol; 0.01 to 0.3 wt % defoamer; and up to 50 ppm biocide, wherein a total of all components adds to 100 wt %. Also disclosed are films prepared from the mold release solutions, as well as methods of coating a substrate using such mold release solutions.

18 Claims, No Drawings

MOLD RELEASE FOR ENGINEERED STONE AND OTHER MOLD RELEASE APPLICATIONS

FIELD OF THE DISCLOSURE

Embodiments herein are directed toward mold release compositions and methods of use thereof. More specifically, embodiments herein are directed toward compositions or solutions including polyvinyl alcohols having optimized properties for mold release applications.

BACKGROUND

Mold release solutions, such as those used to spray coat and form a film over a mold surface, often include a multiplicity of components in the formulation. Unfortunately, aqueous solutions containing nonpolar ingredients undergo phase separation during storage or shipping, especially in cold conditions. Due to this reason, compositions for use as mold release agents, including many of those that include a polyvinyl alcohol resin component, are delivered to the end use customer in the form of a "kit," where the multiple components need to be mixed and cooked prior to use. One such system is disclosed in U.S. Pat. No. 6,627,694, for example.

Mold release compositions serve two primary functions, namely separating the molded product cleanly from the mold, and protecting the mold from the composition being molded. In addition to providing a mold release property, mold release films may also provide a protective barrier between the mold and what is being molded. For example, slabs having granulate or particles of stone are often molded using a binder containing styrene monomer which may degrade the rubber molds. The mold release film must have adequate barrier properties to prevent migration of the styrene. For this reason, mold release films should be of a low porosity and therefore impervious to monomers such as styrene and other compounds that could potentially degrade the molds. Generation of foam during the spray coating process may, however, create pinholes in the resulting foam, decreasing the protective nature of the mold release film. On-site mixing may result in bubble formation and cause foaming during the spray coating process.

SUMMARY

In one aspect, embodiments disclosed herein relate to a homogeneous, aqueous mold release solution. The mold release solution of such embodiments include: 5 to 90 wt % water; 3 to 40 wt % of a polyvinyl alcohol; 0.01 to 3.2 wt % of a surfactant; 1 to 20 wt % of a sugar alcohol; 0.005 to 1.05 wt % of a defoamer; and up to 50 ppm of a biocide, where a total of all components adds to 100 wt %. The mold release solutions have a viscosity in a range from 20 to 600 cps when measured at 23° C.

In another aspect, embodiments disclosed herein relate to a homogeneous, aqueous mold release solution. The mold release solution of such embodiments include: 5 to 85 wt % water; 10.5 to 15 wt % of a polyvinyl alcohol; 0.56 to 0.8 wt % of a surfactant; 1 to 8 wt % of a sugar alcohol; 0.01 to 0.3 wt % of a defoamer; and up to 50 ppm of a biocide, wherein a total of all components adds to 100 wt %. The mold release solutions have a viscosity in a range from 80 to 300 cps when measured at 23° C.

In yet another aspect, embodiments herein relate to a film prepared from the homogeneous, aqueous mold release solutions.

In a further aspect, embodiments herein relate to a method of coating a substrate. Embodiments of the method for coating a substrate include forming a solution coated substrate by spraying the homogeneous, aqueous mold release solutions herein onto a substrate, and drying the homogeneous, aqueous mold release solution of the solution coated substrate to form a film.

Other aspects and advantages of the claimed subject matter will be apparent from the following description and the appended claims. This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

In one aspect, embodiments disclosed herein relate to mold release compositions and methods of use thereof. More specifically, embodiments herein are directed toward compositions or solutions including polyvinyl alcohols having improved or optimized properties for mold release applications.

Components of mold release compositions according to embodiments herein include water, a polyvinyl alcohol, a surfactant, a defoamer, and a sugar alcohol or a polyol. Mold release compositions according to embodiments herein may also include a biocide, if desired.

Polyvinyl alcohols useful in embodiments herein may be formed via the copolymerization of a vinyl ester monomer and one or more selected comonomers via bulk polymerization, solution polymerization, emulsion polymerization, suspension polymerization, and the like. Vinyl ester monomers (primary monomer) may include various aliphatic acids, such as vinyl formate, vinyl acetate, vinyl butyrate, vinyl pivalate, and vinyl versatate, among others. The resulting polymer thus obtained may be saponified, and the resulting polyvinyl alcohol may have a degree of hydrolysis in the range from about 65 to about 99 mol % in some embodiments, in the range from about 72 to about 99 mol % in other embodiments, in the range from about 75 to about 98 mol % in other embodiments, or in the range from about 80 to about 95 mol % in other embodiments, as indicated by $C^{13}$NMR analyses. In yet other embodiments, the polyvinyl alcohol may have a degree of hydrolysis of at least about 80 mol %. Polyvinyl alcohols according to embodiments herein may thus include vinyl alcohol and vinyl ester monomers, the relative amounts of which depend upon the degree of saponification.

The polyvinyl alcohols useful in mold release solutions according to embodiments herein may have a relative molecular weight indicated by a characteristic viscosity in the range from about 2 to about 75 cps, such as from about 2 to about 50 cps, in some embodiments; in the range from about 3 to about 30 cps in other embodiments; or from about 4 to about 30 cps in yet other embodiments. In yet other embodiments, polyvinyl alcohols useful in mold release solutions according to embodiments herein may have a relative molecular weight indicated by a characteristic viscosity in the range from a lower limit of 2, 3, 3.5, 4, 4.5, 5, 5.2, 5.5, 5.7, 6, 6.2, 6.5, 7, 10, 12, or 15 cps to an upper limit of 4.5, 5, 5.5, 5.7, 6, 6.2, 6.5, 7, 10, 12, 15, 20, 30, 40, or 50 cps, where any lower limit may be combined with any upper limit. The characteristic viscosity is determined on a 4 wt % solution of the polymer in water, measured on a Brookfield viscometer at 23° C. Molecular weights (weight average molecular weights) of the polymers may be in a range from about 10,000 to about 250,000, for example.

Polyvinyl alcohols homopolymers useful in embodiments herein may include SELVOL 205, SELVOL 203, SELVOL 523, or SELVOL 540, among other polyvinyl alcohol homopolymers and copolymers available from Sekisui Specialty Chemicals.

The polyvinyl alcohol is present in embodiments of the mold release solutions herein in an amount from about 3 to about 40 percent by weight, based on a total weight of the mold release solution, such as from about 5 to about 25 percent by weight, based on the total weight of the mold release solution. In other embodiments, the polyvinyl alcohol is present in an amount of from about 7.5 to about 20 percent by weight, from about 10 to about 18 percent by weight, or from about 12 to about 17 percent by weight, based on the total weight of the mold release solution. In other embodiments, the polyvinyl alcohol is present in an amount from a lower limit of 8, 9, 10, 10.5, 11, 11.5, 12, 12.5, 13, or 13.5 percent by weight, to an upper limit of 12, 12.5, 13, 13.5, 14, 14.5, 15, 15.5, 16, 16.5, 17, 18, 19, or 20 percent by weight, based on the total weight of the mold release solution, where any lower limit may be combined with any mathematically compatible upper limit.

Sugar alcohols or polyols useful in embodiments herein may include isomalt, maltitol, sorbitol, xylitol, erythritol, adonitol, dulcitol, pentaerythritol, mannitol, glycerin, diglycerin, ethylene glycol, diethylene glycol, triethylene glycol, tetraethylene glycol, a polyethylene glycol, neopentyl glycol, propylene glycol, 1,3-propanediol, 2-methyl-1,3-propanediol, trimethylolpropane, or a polyether polyol, for example. In a particular aspect, embodiments herein may include glycerin as the sugar alcohol.

The sugar alcohols or polyols can be present in the mold release solutions herein in an amount of from about 0.01 to about 20 percent by weight, based on the total weight of the mold release solution. In other embodiments, the sugar alcohols or polyols are present in an amount from about 0.1 to about 15 percent by weight, from about 0.5 to about 10 percent by weight, from about 1 to about 8 percent by weight, from about 2 to about 7 percent by weight, or from about 3 to about 6 percent by weight, based on the total weight of the mold release solution. In other embodiments, the sugar alcohols or polyols are present in an amount from a lower limit of 1, 1.5, 2, 2.5, 3, 3.5, 4, 4.5, 5, 5.5, or 6 percent by weight, to an upper limit of 2, 2.5, 3, 3.5, 4, 4.5, 5, 5.5, 6, 6.5, 7, 7.5, 8, 8.5, 9 or 10 percent by weight, based on the total weight of the mold release solution, where any lower limit may be combined with any mathematically compatible upper limit.

The mold release solutions according to embodiments herein also contain one or more surfactants. Suitable surfactants in some embodiments have a hydrophilic-lipophilic balance (HLB) of from about 9 to about 17. Surfactants are included to aid in the dispersion of the resin solution upon casting.

Suitable surfactants for mold release compositions and films of the present disclosure include, but are not limited to, ionic surfactants, anionic surfactants, cationic surfactants, nonionic surfactants, zwitterionic surfactants, and the like, as well as mixtures thereof.

Surfactants useful in some embodiments herein include dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing.

Other examples of surfactants useful according to embodiments herein include alkyl polyethylene oxides, alkyl phenyl polyethylene oxides, polyethylene oxide block copolymers, acetylenic polyethylene oxides, polyethylene oxide(di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenylhydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGENSC™ available from Daiichi Kogyo Seiyaku, combinations thereof, and the like.

Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof.

Suitable surfactants and wetting or dispersing agents also include TERGITOL TMN series available from Dow, 15-S series available from Dow, STRODEX PK-90 available from Ashland, superspreading Silwet surfactants such as Silwet L77 available from Momentive Performance Materials, fluorinated surfactants available from 3M. Suitable surfactants may include polyether modified poly-dimethylsiloxane, BYK 333, ionic solution of polyacrylic copolymer, BYK 381, polyether modified poly-dimethylalkylsiloxane, BYK 307, and polyether modified polymethylalkylsiloxane, available from BYK Chemic GmbH.

Suitable surfactants may include fluorosurfactants, FC 4430 and 4432, available from 3M, and ZONYL FSN available from Du Pont, Ltd. Suitable surfactants include DYHOL 604, from Air Products, Surfadone LP 100, available from ISP, SURFYNOL 2502, available from Air Products, TEGO GLIDE 410, TEGO GLIDE 100, TEGO FLOW 425, TEGO PROTECT 5000, TEGO PROTECT 5100, TEGO TWIN 4000, TEGO WET KL 245, TEGO WET 510, TEGOT WET 500, TEGO WET 270, TEGO WET 265, and TEGO TWIN 4000, commercially available from Degussa AG.

Suitable surfactants may also include THETAWET FS8050, commercially available from Innovative Chemical Technologies, BYK 347 and BYKDYNWET 800, commercially available from BYK Chemie GmbH, DYNOL 604 and DYNOL 810, commercially available from Air Product, SILSURF A004-AC-UP, commercially available from SILTECH, POLYFOX 136A, 156A, and 151N, available from OMNOVA, and CHEMGAURD S-764p, commercially available from Chemgaurd Chemical. Surfactants useful in embodiments herein include, but are not limited to: amphoteric surfactants, such as Amphoteric N from Tomah Products; silicone surfactants, such as BYK 346 or BYK 348 available from BYK Chemie (BYK-Chemie GmbH, Wesel, Germany); fluorinated surfactants such as Zonyl® FS300 from DuPont (DuPont, Wilmington, Del., USA); and nonylphenoxypolyethoxyethanol based surfactants, such as Triton N-101 available from Dow (Midland, Mich., USA). Other suitable surfactants include ethoxylated decynediols such as Surfynol 465 available from Air Products & Chemicals (Allentown, Pa., USA); alkylaryl polyethers such as Triton CF-10 available from Dow; octylphenoxy polyethoxy ethanols such as Triton X-100 available from Dow; ethoxylated alcohols such as Neodol 23-5 or Neodol 91-8 available from Shell (The Hague, the Netherlands); Tergitol 15-S-7 available from Dow, Steol-4N, a 28% sodium laureth sulfate from Stepan Company (Northfield, Ill., USA), sorbitan derivatives such as Tween 20 or Tween 60 from Uniqema (New Castle, Del., USA), and quaternary ammonium compounds, such as benzalkonium chloride. Other suitable surfactants include organo-silicone surfactants such as Dow-Corning® Q2-5211 from DowCorning Silicones (Midland, Mich., USA), or Silsurf® A008 by Siltech Corporation (Toronto, ON, Canada).

A surfactant mainly composed of a fluorinated modified polymer or a fluorinated modified acrylic polymer may also be used as a surfactant in compositions herein, such as, for example, surfactants under the 3000 series (for example, 3277, 3700, 3770 etc.) by AFCONA company.

In some embodiments, such as those provided in the Examples below, the surfactant may include an organically modified polysiloxane or a polyether modified polydimethyl siloxane (PDMS).

Mixtures of any two or more surfactants can be used. Further, the surfactants may be provided for admixture with the additional components of the mold release composition as aqueous solutions, contributing water to the total amount of water used in the mold release compositions.

The surfactant can be present in any desired or effective amount. In some embodiments herein, the surfactant is present in the mold release solutions herein in an amount of from about 0.01 to about 5 percent by weight, such as from 0.01 to 3.5 percent by weight, based on the total weight of the mold release solution. In other embodiments, the surfactant is present in an amount of from about 0.25 to about 2.5 percent by weight, from about 0.4 to about 1 percent by weight, or from about 0.5 to about 0.8 percent by weight, based on the total weight of the mold release solution. In other embodiments, the surfactant is present in an amount from a lower limit of 0.1, 0.2, 0.3, 0.35, 0.4, 0.45, 0.5, 0.56, 0.6, 0.65 0.7, 0.75 0.8, 0.85, 0.9 or 1.0 percent by weight, to an upper limit of 0.5, 0.55, 0.6, 0.65, 0.7, 0.75, 0.8, 0.85, 0.9, 0.95, 1, 2, 3, 3.1, 3.2, 3.5, 4, or 5 percent by weight, based on the total weight of the mold release solution, where any lower limit may be combined with any mathematically compatible upper limit.

Any suitable defoamer may be used. Defoamers useful in embodiments herein include, but are not limited to, hydrophobic silicas, for example silicon dioxide or fumed silica in fine particle sizes, including Foam Blast® defoamers available from Emerald Performance Materials, and polysiloxane defoamers, among others. Suitable non-surface-active types of foam inhibitors are, for example, organopolysiloxanes and mixtures thereof with finely divided, optionally silanized silicon dioxide, and also paraffins, waxes, microcrystalline waxes and mixtures thereof with silanized silicon dioxide or distearyldiethylenediamine. In some embodiments, a mixture of foam inhibitors is used, such as, for example a silicone, paraffin or wax mixture. In other embodiments, the defoamer may be based on long chain alcohols, like 1-octanol, and polyol esters, such as the FOAM-A-TAC series of antifoaming agents available from Enterprise Specialty Products Inc. (Laurens, S.C.), such as FOAM-A-TAC 402, 407, and 425. In still further embodiments, the defoamer may be in the form of a colloidal mixture or colloidal suspension, such as a mixture including: an oil, such as a hydrocarbon oil (liquid paraffin or wax, for example), an ester oil, or a synthetic or semisynthetic oil, such as a polyethylene glycol or a polypropylene glycol, a long chain alcohol, or the like; a fatty acid or stearate; and colloidal particles, such as a hydrophobic silica. In some embodiments, the colloidal mixture may include an oxyalkylene glycol combined with a fatty acid and colloidal particles.

The defoamer or a mixture of defoamers can be present in any desired or effective amount. In some embodiments herein, the defoamer or mixture of defoamers is present in an amount from about 0.005 to about 1.25 percent by weight, such as from about 0.01 to about 0.75 percent by weight, based on the total weight of the mold release solution. In other embodiments, the defoamer or mixture of defoamers is present in an amount from about 0.15 to about 0.65 percent by weight, from about 0.2 to about 0.6 percent by weight, or from about 0.3 to about 0.5 percent by weight, based on the total weight of the mold release solution. In other embodiments, the defoamer or mixture of defoamers is present in an amount from a lower limit of 0.005, 0.01, 0.05, 0.1, 0.15, 0.2, 0.25, 0.3, 0.35, 0.4, or 0.45 percent by weight, to an upper limit of 0.3, 0.35, 0.4, 0.45, 0.5, 0.55, 0.6, 0.65, 0.7, 0.75, 0.8, 0.85, 0.9, 0.95, 1.0, 1.05, 1.1, 1.15, or 1.2 percent by weight, based on the total weight of the mold release solution, where any lower limit may be combined with any mathematically compatible upper limit.

In some embodiments, the defoamer is a mixture of defoamers including a first defoamer and a second defoamer, each individually used in an amount in a range from 0.005 to 0.55 wt %, such as from 0.01 to 0.3 wt %, based on the total weight of the mold release solution. For example, in some embodiments, the mixture of defoamers may include the above-described colloidal suspension or colloidal mixture in an amount from 0.01 to 0.3 wt %, such as 0.15 to 0.25 wt %, based on the total weight of the mold release solution, and polydimethylsiloxane (PDMS) in an amount from 0.05 to 0.25 wt %, such as from 0.1 to 0.2 wt %, based on the total weight of the mold release solution. Other various mixtures of suitable defoamers may also be used.

Suitable examples of biocides useful in the mold release solutions according to embodiments herein include preparations containing one or more of isothiazolinone, methyl-4-isothiazoline (MIT), 5-chloro-2-methyl-4-isothiazolin-3-one, 2-methyl-4-isothiazolin-3-one, or 1,2-benzisothiazol-3-one (BIT), 1,3 bis(hydroxymethyl)-5,5-dimethyl-2,4 imidazolidinedione, and 3-butyl-2-iodopropynyl carbamate, among others known in the art. Such biocide or mixtures of biocides may be commercially available under the trade names PREVENTOL D7 (Lanxess), KATHON LX or KATHON CG/ICP (Dow), ACTICIDE SPX (Thor GmbH) and PROXEL GXL (Arch Chemicals), among others.

The biocide or mixtures of biocides can be present in any desired or effective amount. In some embodiments herein, the biocide or mixtures of biocides is present in an amount of from about 0.01 to about 50 ppm by weight, based on the total weight of the mold release solution. In other embodiments, the biocide or mixtures of biocides is present in an amount of from about 10 to about 40 ppm by weight, based on the total weight of the mold release solution. While present in minimal amounts, the presence of a biocide may provide for storage and shipment of the mold release solutions herein as an aqueous composition.

The components detailed above, including the polyvinyl alcohol, surfactant, sugar alcohol or polyol, defoamer, and biocide, may be present in the mold release solutions at the amounts noted, with the balance of the composition provided by water. Naturally, the total amount of all components used in the mold release compositions adds up to 100%. In general, water may be present in the mold release solutions herein in amounts up to about 90 percent by weight, such as from about 40 or 45 to 85 or 90 percent by weight. In other embodiments, water is present in an amount of from about 65 to about 85 percent by weight, from about 70 to about 85 percent by weight, or from about 75 to about 85 percent by weight, based on the total weight of the mold release solution. In other embodiments, water is present in an amount from a lower limit of 65, 66, 67, 68, 69, 70, 71, 72, 73, 74, 75, 76, 77, 78, 79, or 80 percent by weight, to an upper limit of 70, 71, 72, 73, 74, 75, 76, 77, 78, 79, 80, 81, 82, 83, 84, or 85 percent by weight, based on the total weight of the mold release solution, where any lower limit may be combined with any mathematically compatible upper limit.

In yet other embodiments, the components detailed above may be provided in concentrated form, where additional water may be added after shipping to arrive at the above-noted water concentrations for preparation of the final mold release solution to be used. For example, concentrates of the mold release solutions herein may include from about 15 to about 60 percent by weight water, or from about 25 to about 55 percent by weight water or from about 40 to about 50 percent by weight water in other embodiments. The concentrates may thus include proportional increases in the concentration of the remaining components (polyvinyl alcohol, defoamer, surfactant, etc.) resulting from the decreased water content, and as such concentrations may be readily calculated by one skilled in the art, explicit ranges for each of the above-noted components in concentrates according to embodiments herein are not presented.

Desired amounts of the above-described components may be mixed to form a mold release solution according to embodiments herein. The mold release solution may be a homogeneous mixture of water, the polyvinyl alcohol, surfactant, sugar-alcohol or polyol, defoamer (anti-foaming agent), and optional biocide.

In some embodiments, the mold release solution may have a viscosity in a range from 20 to 600 cps, such as from 50 to 400 cps. In other embodiments, the mold release solution may have a viscosity in a range from 60 to 350 cps, from 80 to 300 cps, or from 100 to 200 cps. In other embodiments, the mold release solution may have a viscosity in a range from a lower limit of 20, 30, 40, 50, 60, 70, 80, 90, 100, 120, 140, 160, 180 or 200 cps, to an upper limit of 150, 175, 200, 250, 300, 350, 400, 450, 500, 550, or 600 cps, where any lower limit may be combined with any mathematically compatible upper limit. Viscosity of the mold release solution is measured according to ASTM Method E3116-18 at 23° C. using spindle #31.

Mold release solutions according to embodiments herein are homogeneous solutions and are storage stable solutions. Storage stable solutions herein are solutions that do not separate or precipitate during storage, shipment, and other handling over an extended time period prior to end use. For example, embodiments of mold release solutions herein may be storage stable at room temperature or atmospheric conditions (e.g., 15 to 45° C.) for at least 6 months, at least one year, or up to two years or more in some embodiments.

Other embodiments herein are cold storage stable solutions. Cold storage stable solutions herein are solutions that do not separate or precipitate during storage, shipment, and other handling over an extended time period prior to end use, where the storage, shipment or other handling is under cold conditions, such as during a cold (winter) season or if stored under refrigerated conditions (e.g., 5° C. to 15° C.). For example, embodiments of mold release solutions herein may be cold storage stable (i.e., at a temperature of 5° C., 10° C., or a temperature in the range from 5° C. to 15° C., for example) for at least 6 months, at least one year, or up to two years or more in some embodiments.

Embodiments of the concentrates of the mold release solutions described herein are also storage stable and/or cold storage stable. Such embodiments advantageously allow for lower shipping weight and storage volumes while providing for easy measuring and mixing with water to obtain the as-used mold release solution.

Mold release solutions according to embodiments herein are low foaming compositions. For example, when tested according to ASTM Method E2407-04, mold release solutions according to embodiments herein may have a Warring Blender Foam Height in a range from 50 to 700 mm at time=0, from 10 to 350 mm at time=3 minutes, and from 0 to 300 mm at time=6 minutes. In other embodiments, mold release solutions may have a Warring Blender Foam Height in a range from 200 to 500 mm at time=0, from 110 to 200 mm at time=3 minutes, and from 0 to 110 mm at time=6 minutes. In other embodiments, mold release solutions may have a Warring Blender Foam Height in a range from 300 to 475 mm at time=0, from 150 to 200 mm at time=3 minutes, and from 75 to 125 mm at time=6 minutes, when tested according to ASTM Method E2407-04. In yet other embodiments, mold release solutions may have a Warring Blender Foam Height in a range from 400 to 500 mm at time=0, from 150 to 200 mm at time=3 minutes, and from 80 to 120 mm at time=6 minutes, when tested according to ASTM Method E2407-04.

Mold release solutions according to embodiments herein may have a surface tension in a range from about 15 to about 50 mN/m, from about 19 to about 33 mN/m, or from about 20 to about 30 mN/m, as measured at 23° C. according to ASTM D1331-20. In other embodiments, mold release solutions according to embodiments herein may have a surface tension in a range from about 21 to about 25 mN/m, such as from about 22 to about 24 mN/m.

Mold release solutions according to embodiments herein may have a surface tension that is relatively close to the surface energy of the substrate onto which it is to be used. For example, the mold release solutions may have a surface energy that is within 5 dynes of the surface energy of the substrate, within 4 dynes of the surface energy of the substrate, within 3 dynes of the surface energy of the substrate, within 2 dynes of the surface energy of the substrate, or within 1 dyne of the surface energy of the substrate. The type and quantity of the surfactant, as well as other components, may impact the surface tension of the mold release solution.

The above-described mold release solutions may be disposed upon a substrate and dried to form a mold release film. For example, the mold release solutions may be spray cast onto a substrate. No cooking or pre-heating of the solution is required, as the sprayable solutions are suitable for use as formulated above. Following spray casting, the water may be evaporated to form the mold release film. The evaporation of the water may be facilitated by heating, vacuum, or both, and may be conducted at temperatures in the range from 55 to 90° C., for example. It is preferred to maintain conditions of pressure and temperature so as to avoid bubble formation in the solution during drying. Further, the antifoaming properties of mold release solutions herein may help minimize or avoid micropores or other inconsistencies in the resulting film, thereby providing excellent barrier properties between the mold and what is being molded. In other words, embodiments of mold release solutions herein may provide a bubble-free coating when sprayed onto a surface of a substrate. Some embodiments herein may provide a film coating having a film coverage of 50 to 55 grams/m² (g/m²), for example, such as from 51 to 52 g/m², although greater or lesser film coverage may also be possible with various embodiments herein.

Additionally, embodiments of the mold release solutions herein may provide films that are of sufficient tensile strength so as to be removed from the substrate or the mold with minimal or no tearing, and in some embodiments the films are removable as a single sheet. For example, films formed from mold release solutions herein may have a tensile strength in a range from 3.8 to 8 MPa as measured according to ASTM D882-18. In other embodiments, films formed from mold release solutions herein may have a tensile strength in a range from 4 to 7.5 MPa, from 4.5 to 7 MPa, from 5 to 6.8 MPa, from 5.2 to 6.6 MPa, or from 5.4 to 6.4 MPa.

Some embodiments of mold release solutions herein have a surface tension that is inversely proportional to the foam height. For example, embodiments of the homogeneous, aqueous mold release solutions have a ratio of a 6-minute foam height as measured by ASTM E2407 to a surface tension as measured by ASTM D1331 (6-min foam height/surface tension) that is less than or equal to 4.2 mm/(mN/m). In such embodiments, films formed from the aqueous mold release solution have a dry film strength (tensile strength) that is greater than or equal to 5 MPa as measured according to ASTM D882-18.

Substrates that may be coated with mold release solutions and films according to embodiments herein may include natural and synthetic rubbers, polyethylene and polyethylene copolymers, polyethylene terephthalate, and polypropylene and polypropylene copolymers, among others. Embodiments herein thus provide a polyvinyl alcohol composition and film for use as a mold release, such as for engineered stone and other mold release applications.

In some embodiments, for example, mold release solutions and films formed therefrom may be used in the manufacture of engineered stone. Engineered stone is a composite material made of crushed stone bound together by an adhesive to create a solid surface. As described in U.S. Pat. No. 6,627,694 and patents referenced therein, including EP0786325 and WO1999/021695, the manufacture of engineered stone involves disposing a mixture consisting of granulate and a resin on a substrate and subsequently compacting and curing the mixture to form the engineered stone. Rubber sheets used in such an engineered stone molding process may be coated with mold release solutions as described herein, the resulting mold release films advantageously providing excellent barrier properties, resulting from minimal foaming and bubble formation during spraying and drying, as well as excellent removability from the substrate and the engineered stone, resulting in part due to the thickness of the sprayed solution (viscosity and high solids content) and the tensile strength of the film.

Examples

A mold release solution according to embodiments herein was prepared and included a mixture of polyvinyl alcohol (SELVOL 205), surfactant, glycerin, defoamer, water, and biocide. The mold release solution included approximately 80.4 wt % water, 13.4 wt % polyvinyl alcohol, 5.3 wt % glycerin, 0.6 wt % surfactant, 0.35 wt % of a mixture of anti-foaming agents (Foam Attack FA-418 and a polysiloxane), and 0.2 wt % biocide.

As comparative samples, a mold release composition according to the "preferred" embodiments of U.S. Pat. No. 6,627,694 was prepared, which included approximately 5.5 parts glycerin, 0.35 parts defoamer (BYK-024, a polysiloxane), 0.6 parts surfactant (BYK-346, an aqueous solution of polyether modified PDMS), 10 parts of a polyvinyl alcohol (using SELVOL 205 for comparative purposes), and 100 parts water.

The compositions of the sample and comparative samples are provided in Table 1 below.

TABLE 1

| Ingredient | Comparative 1, U.S. Pat. No. 6,627,694 | Comparative 2, U.S. Pat. No. 6,627,694 | Comparative 3, U.S. Pat. No. 6,627,694 | Embodiment Sample |
|---|---|---|---|---|
| Water | 0.8578 | 0.8398 | 0.8296 | 0.8035 |
| SELVOL 205 | 0.086 | 0.104 | 0.104 | 0.1343 |
| Glycerine | 0.0473 | 0.473 | 0.0554 | 0.0526 |
| Surfactant | 0.0043 | 0.0043 | 0.0055 | 0.006 |

TABLE 1-continued

| Ingredient | Comparative 1, U.S. Pat. No. 6,627,694 | Comparative 2, U.S. Pat. No. 6,627,694 | Comparative 3, U.S. Pat. No. 6,627,694 | Embodiment Sample |
| --- | --- | --- | --- | --- |
| Defoamer | 0.0026 | 0.0026 | 0.0035 | 0 |
| Biocide | 0.002 | 0.002 | 0.002 | 0.002 |
| Anti-Foaming Agent 1 | 0 | 0 | 0 | 0.002 |
| Anti-Foaming Agent 2 | 0 | 0 | 0 | 0.0015 |

The above-described sample and comparative sample were tested to determine tensile strength (ASTM D882-18), viscosity (ASTM E3116-18), and foaming properties (ASTM E2407-04). Overall, the sample mold release solution according to embodiments herein had a higher viscosity and lower foam heights than the comparative sample, and the films produced by the sample mold release solution according to embodiments herein had a higher tensile strength than the film formed from the comparative sample, as shown in Table 2 and Table 3.

TABLE 2

| Test Method Sample | ASTM E3116-18 Solution Viscosity (cps) | ASTM D1331-20 Solution Surface Tension (mN/m) | Film properties (ASTM D882-18) | | |
| --- | --- | --- | --- | --- | --- |
| | | | Tensile Strength (MPa) | Elongation at Break (%) | Modulus (MPa) |
| Embodiment Sample | 162 | 23.37 | 5.9 | 340 | 23 |
| Comparative Sample 1 | 32 | 22.55 | 3 | 240 | 13 |

TABLE 3

| Sample | Warring Blender Foam Height (mm) (ASTM E2407-04) | | |
| --- | --- | --- | --- |
| | Time = 0 minutes | Time = 3 minutes | Time = 6 minutes |
| Embodiment Sample | 450 | 175 | 96 |
| Comparative Sample 1 | 600 | 400 | 225.0 |
| Comparative Sample 2 | 600 | 425 | 267 |
| Comparative Sample 3 | 575 | 325 | 167 |

Embodiments of the present disclosure may provide at least one of the following advantages.

Compared to prior art samples, embodiments herein may provide a mold release solution having a viscosity that, upon spraying, may provide a uniform coating thickness. Further, due to the viscosity, there may be less runoff and a decreased amount of overspray. Recycle of overspray may result in foaming of the solution to be sprayed, and thus embodiments herein provide for decreased foaming and possibility for imperfections in the resulting film.

Due to the low foaming nature of mold release solutions as described herein, microbubbles and other defects in the resulting films may be minimized, and the resulting mold release films have excellent barrier properties to prevent migration of monomers, such as styrene, as may be used in compositions being molded. The resulting low porosity films may thus advantageously protect molds from monomers such as styrene and other compounds that would otherwise degrade the molds, improving mold life and reusability.

The viscosity and solids content of solutions according to embodiments herein may also provide for decreased drying times or increased drying efficiency, meaning lower temperatures may be used for drying over a similar time period, both of which may lead to energy savings.

Further, the polymer molecular weight, degree of hydrolysis, and resulting film thickness may provide for a thicker, more resilient film having better removability from the substrate and molded article.

Additionally, embodiments herein may provide for homogenous, storage and/or cold storage stable mold release solutions. Such solutions may avoid on-site mixing and cooking of batches, decreasing material handling, manpower requirements, and additional opportunities for foam generation and human error. Embodiments herein thus address the commercial need for a homogeneous mold release solution that can be shipped and stored while also meeting all of the needed performance requirements.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A homogeneous, aqueous mold release solution, comprising:
   45 to 90 wt % water;
   3 to 40 wt % of a polyvinyl alcohol;
   0.01 to 3.2 wt % of a surfactant;
   1 to 20 wt % of a sugar alcohol;
   0.005 to 1.05 wt % of a defoamer; and
   up to 50 ppm of a biocide,
   wherein a total of all components adds to 100 wt %, and
   wherein the homogeneous, aqueous mold release solution has a viscosity in a range from 20 to 600 cps when measured at 23° C.

2. The homogeneous, aqueous mold release solution of claim 1, comprising:
   75 to 85 wt % water;
   10.5 to 15 wt % of a polyvinyl alcohol;
   0.56 to 0.8 wt % of a surfactant;
   1 to 8 wt % of a sugar alcohol;
   0.01 to 0.3 wt % of a defoamer; and
   up to 50 ppm of a biocide,
   wherein a total of all components adds to 100 wt %, and
   wherein the homogeneous, aqueous mold release solution has a viscosity in a range from 80 to 300 cps when measured at 23° C.

3. The homogeneous, aqueous mold release solution of claim 1, wherein the polyvinyl alcohol is a polyvinyl alcohol homopolymer having:

a degree of hydrolysis in a range from 70 to 99 mole %; and a 4% solution viscosity in the range from 2 to 72 cps as measured at 23° C.

4. The homogeneous, aqueous mold release solution of claim 1, wherein the surfactant comprises an organically modified polysiloxane or a polyether modified polydimethyl siloxane (PDMS).

5. The homogeneous, aqueous mold release solution of claim 1, wherein the defoamer comprises a colloidal mixture including an oxyalkylene glycol, a fatty acid, and colloidal particles.

6. The homogeneous, aqueous mold release solution of claim 5, wherein the defoamer comprises a mixture of polydimethyl siloxane and the colloidal mixture.

7. The homogeneous, aqueous mold release solution of claim 1, wherein the biocide comprises isothiazolinone.

8. The homogeneous, aqueous mold release solution of claim 1, wherein the homogeneous, aqueous mold release solution is storage stable for a period of at least one year.

9. The homogeneous, aqueous mold release solution of claim 1, wherein the homogeneous, aqueous mold release solution is cold storage stable for a period of at least six months.

10. The homogeneous, aqueous mold release solution of claim 1, wherein the homogeneous, mold release solution has a viscosity in a range from 80 to 300 cps when measured at 23° C.

11. The homogeneous, aqueous mold release solution of claim 1, wherein the homogeneous, aqueous mold release solution has a Warring Blender Foam Height in a range from 50 to 700 mm at time=0, from 10 to 350 mm at time=3 minutes, and from 0 to 300 mm at time=6 minutes, when tested according to ASTM Method E2407-04.

12. The homogeneous, aqueous mold release solution of claim 1, wherein the homogeneous, aqueous mold release solution has a surface tension in a range from about 19 to about 33 dynes/cm as measured at 23° C. according to ASTM D1331-20.

13. The homogeneous, aqueous mold release solution of claim 1, wherein the homogeneous, aqueous mold release solution has a ratio of a 6 minute foam height as measured by ASTM E2407 to a surface tension as measured by ASTM D1331 that is less than or equal to 4.2 mm/(mN/m), and wherein a film formed from the homogeneous, aqueous mold release solution has a dry film strength that is greater than or equal to 5 MPa as measured according to ASTM D882-18.

14. The homogeneous, aqueous mold release solution of claim 1, wherein the sugar alcohol is glycerin.

15. A method of coating a substrate, comprising:

forming a solution coated substrate by spraying the homogeneous, aqueous mold release solution of claim 1 onto a substrate; and drying the homogeneous, aqueous mold release solution of the solution coated substrate to form a film.

16. The method of claim 15, wherein the homogeneous, aqueous mold release solution of the solution coated substrate is bubble-free.

17. The method of claim 15, wherein the film is removable from the substrate as a single sheet of the film.

18. The method of claim 16, wherein the homogeneous, aqueous mold release solution has a surface energy within 5 mN/m of a surface energy of the substrate, as measured according to ASTM D1331-20.

* * * * *